United States Patent [19]
Carpenter et al.

[11] Patent Number: 5,794,878
[45] Date of Patent: Aug. 18, 1998

[54] DEVICE FOR PREVENTION OF SLAP-BACK LOCK OF INERTIA REEL

[75] Inventors: Christopher Carpenter, Tempe; Lindsay P. Zollinger, Phoenix, both of Ariz.; Michael J. Freeman, Romeo, Mich.; James C. Warrick, Tempe; Willard F. Hagan, Gilbert, both of Ariz.

[73] Assignee: Am-Safe, Inc., Phoenix, Ariz.

[21] Appl. No.: 861,882

[22] Filed: May 20, 1997

[51] Int. Cl.$^6$ ............................................. B60R 22/28
[52] U.S. Cl. ............................................. 242/381; 280/805
[58] Field of Search .................... 242/381; 280/805; 180/268; 297/475

[56] References Cited

U.S. PATENT DOCUMENTS

| | | | |
|---|---|---|---|
| 3,907,256 | 9/1975 | Kankkunen | 242/381 |
| 4,130,253 | 12/1978 | Yasumatsu . | |
| 4,130,254 | 12/1978 | Yasumatsu et al. . | |
| 4,130,255 | 12/1978 | Sasaki et al. . | |
| 4,173,332 | 11/1979 | DuLondel | 254/160 |
| 4,235,419 | 11/1980 | Schuck . | |
| 4,262,933 | 4/1981 | Fox . | |
| 4,300,731 | 11/1981 | Kondziola . | |
| 4,385,775 | 5/1983 | Shimogawa et al. . | |
| 4,446,884 | 5/1984 | Rader, Jr. | 242/381 |
| 4,722,495 | 2/1988 | Meredith . | |
| 4,771,854 | 9/1988 | Syrowik . | |
| 4,925,124 | 5/1990 | Hoyt et al. . | |
| 4,940,193 | 7/1990 | Grabowski . | |
| 5,255,868 | 10/1993 | Reulein . | |

FOREIGN PATENT DOCUMENTS

| | | | |
|---|---|---|---|
| 611271 | 11/1948 | United Kingdom . | |
| 685591 | 1/1953 | United Kingdom . | |
| 1003162 | 9/1965 | United Kingdom . | |
| 1354804 | 5/1974 | United Kingdom . | |
| 1 440 232 | 6/1976 | United Kingdom . | |
| 2 265 541 | 10/1993 | United Kingdom | 280/805 |

*Primary Examiner*—John P. Darling
*Attorney, Agent, or Firm*—Rudnick & Wolfe

[57] ABSTRACT

A conventional webbing-locking inertia reel is modified by integration of a device for the prevention of slap-back lock of the inertia reel upon excessively rapid retraction of the webbing worn by a seat occupant as a safety belt and/or harness. The device also slows the retraction of the webbing enough to prevent a hard collision of the webbing stop at the inertia reel. This is accomplished by interacting the reel shaft with a specially designed damping disk so that both the shaft and the damping disk rotate counter-clockwise when an external force pulls the webbing from its rotatable spool, while simultaneously the shaft also interacts with a conventional housed return spring, causing it to wind and build up a rewinding force, which, when the external force is removed or ceases, causes rotation of the shaft, spool, and damping disk clockwise and rewinds the webbing on the spool. The damping disk is installed in a damper housing section filled with a special high-viscosity synthetic grease so that damping occurs when the damping disk is rotated, due to the shear of the grease that occurs when the two surfaces, that of the damping disk and the housing wall, move relative to each other.

11 Claims, 3 Drawing Sheets

5,794,878

1

DEVICE FOR PREVENTION OF SLAP-BACK LOCK OF INERTIA REEL

FIELD OF THE INVENTION

The present invention relates to seat restraint systems used in vehicles. Particularly, the present invention is directed to the operation of an inertia reel used in seat restraint systems in aircraft.

BACKGROUND OF THE INVENTION

As is well known, seat restraints for vehicles such as aircraft use a webbing strap to restrain a seat occupant. When the webbing strap used in the restraint system is buckled and adjusted snugly over the waist and/or shoulders of the seat occupant, the seat restraint system holds the occupant in their seat during sudden decelerations of the aircraft caused by collisions or crashes.

In a typical restraint system an inertia reel is used to wind the webbing on a spool that contains a ratchet wheel on each side of the spool and a shaft which defines the axis of rotation of the inertia reel. A spring is attached to the shaft which provides a torque tending to rotate the inertia reel so as to pull the webbing snugly against the seat occupants. The inertia reel also houses a strap-acceleration sensing mechanism which causes a pawl to fall into one of the teeth on each of the ratchet wheels when a strong jerk is applied to the webbing and prevents additional extension of the webbing thus restraining movement of the seat occupant and preventing injury. While this action is desirable in the case of a sudden deceleration of the aircraft, it is undesirable when it sometimes happens due to an excessively rapid retraction of the webbing. In some circumstances the reel is immobilized and ceases to allow webbing to be reextended. This is termed "slap-back block" and immobilizes the seat restraint. Rapid retraction of the webbing, called "slap-back action," can also cause other problems. The fast and sometimes unexpected motion of the metal lug at the end of the webbing can strike and damage nearby objects. In addition, the slap-back action sometimes causes the windings of the spring to be suddenly forced onto one another causing compact block.

Various patents have been granted that are designed to prevent slap-back lock, but they are more complicated than and/or different from the invention described in the following summary of the invention. For example, U.S. Pat. No. 5,255,868 issued to Hermann Reulein, entitled "Self-Locking Safety Belt Reeling Device with a Shock-Absorbing Device," discloses a device using two springs, a return spring and a smaller shock-absorbing spring both arranged inside the spring housing connected to a belt housing. In a first operational state, the return spring and shock-absorbing spring together function as the reeling spring. In a second operational state, only the shock-absorbing spring functions as a reeling spring. In such a complicated arrangement there is a possibility of the occurrence of operational problems.

Other U.S. patents, such as U.S. Pat. No. 4,262,933 issued to Fox; U.S. Pat. No. 4,940,193 issued to Grabowski; U.S. Pat. No. 4,130,253 issued to Yasumatsu; U.S. Pat. No. 4,130,254 issued to Yasumatsu et al.; U.S. Pat. No. 4,130,255 issued to Shiro and Yasumatsu; U.S. Pat. No. 4,235,419 issued to Schnek; U.S. Pat. No. 4,300,731 issued to Kondziola; U.S. Pat. No. 4,385,775 issued to Shimogawa et al; U.S. Pat. No. 4,722,495 issued to Meredith; U.S. Pat. No. 4,771,854 issued to Syrowik; and U.S. Pat. No. 4,925,124 issued to Hoyt and Thomas may be read for further information on present known seat restraint systems.

In view of the above, there remains a need for a reliable mechanism which will prevent slap back lock but still provides for standard inertia reel operation.

SUMMARY OF THE INVENTION

It is an object of the present invention to prevent slap-back action of an inertia reel.

Another object is to prevent slap-back lock of an inertia reel.

Still another object is to prevent compact block in an inertia reel.

It is a further object of the present invention to accomplish the preceding objectives while still allowing the inertia reel to sense and prevent a sudden extension of the webbing.

The present invention achieves the preceding objectives by leaving the conventional inertia reel essentially unchanged but adapting the shaft so that it interacts simultaneously with the spring and the spindle of a specially designed damping disk. The disk rotates in a damper housing filled with a fluid, which fluid exerts a drag force on the rotating disk. This drag force serves to reduce the speed at which the webbing retracts, thereby preventing slap-back action and the associated problems of slap-back lock and compact block.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

DETAILED DESCRIPTION OF THE PREFERRED EMBODIMENT

Figure 1A:
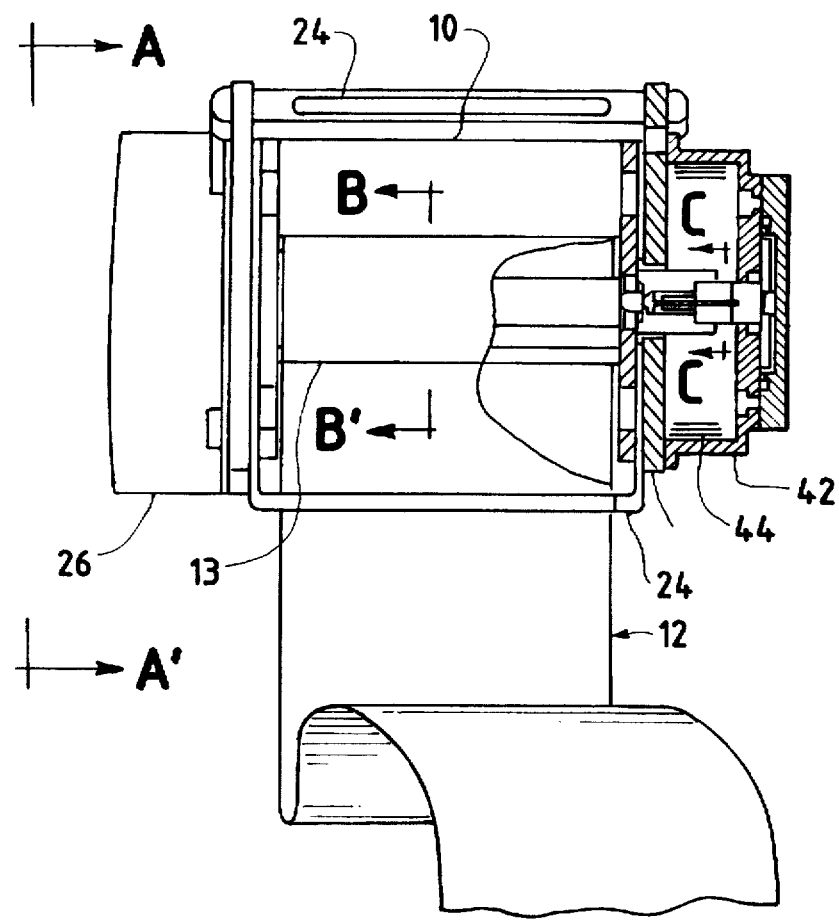
FIG. 1A is a cutaway view of an inertia reel according to the present invention, with the webbing attached.

Reference will now be made in detail to the present preferred embodiment of the seat restraint reel of the invention, examples of which are illustrated in the accompanying drawings. Wherever possible, the same reference characters will be used throughout the drawings to refer to the same or like parts. The method of the present invention will be described in conjunction with the detailed description of the slap-back lock for inertia reels.

Figure 1B:
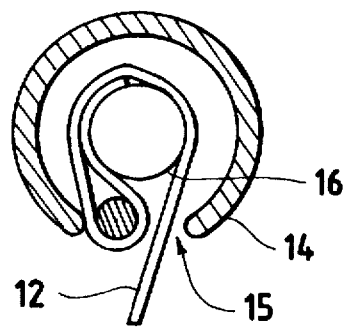
FIG. 1B is a cutaway view along line B-B' of FIG. 1A of the present invention.

FIG. 1A shows a cutaway view of an inertial reel 10, according to the present invention with attached webbing 12. The webbing 12 is attached to a spooling assembly 13, around which the webbing can be reeled and unreeled. The spooling assembly 13 in the preferred embodiment is shown in detail in FIG. 1B, which is a cutaway view along line B-B' of FIG. 1A. The webbing 12 is fully unreeled in this view. In the preferred embodiment, the spooling assembly is comprised of a spool 14 attached to and surrounding a shaft 16. The shaft 16 serves to define the axis of the inertia reel. The webbing is attached to the shaft 16 and emerges from the spool 14 through spool slot 15. When the spooling assembly 13 is rotated in a clockwise direction (as viewed from the lines A-A' in FIG. 1A), the webbing 12 is reeled in, and wraps around the outer surface of spool 14. When the webbing 12 is pulled to unreel it, the spooling assembly rotates in the counter-clockwise direction. In the preferred embodiment, the spool 14 serves to define the minimum reeled radius of the webbing 12. Alternatively, a shaft 16 may be used without a separate spool 14, or the shaft 16 could be made the diameter of the present spool 14, or the webbing 12 may be attached to the spool 14 directly, without affecting the functionality of the present invention. The supporting frame 18 supports the inertia reel 10 via a pair of opposite frame walls 20 and 22 which sandwich the spooling assembly 13. Just to the inside of frame walls 20 and 22 are ratchet wheels 38 and 40 attached to spool 14. Ratchet wheels 38 and 40 are disk-shaped with teeth along the circumference. Mounted on and between frame walls 20 and 22 is lock-bar 36, which is able to move between a first position where lock-bar 36 does not contact ratchet wheels 38 and 40 and a second position where lock-bar 36 engages the teeth of ratchet wheels 38 and 40 thereby preventing inertia reel 10 from rotating in the counter-clockwise (unreeling) direction. A guide slot 24 is mounted on the shaft 16 between the opposite frame walls 20 and 22, and can rotate about the axis of the inertia reel 10 within a defined angular range. The webbing 12 emerges from the inertial reel through the guide slot 24. A webbing stop (not shown) is attached to the webbing 12 near its free end. The webbing stop cannot be pulled through the guide slot 24, and thus serves to define the maximum extent to which the webbing 12 can be reeled up. In the preferred embodiment, the webbing 12 is a strap, and the webbing stop is where the webbing strap has been made thicker by sewing another portion of strap thereto. Other means of forming a functional webbing stop will be readily apparent to those skilled in the art.

In the present application, the supporting frame 18 containing the inertia reel 10 is attached to the back and/or side of a seat frame, bulkhead, or floor, as part of a set restraint system. Although designed for aircraft seats, the seat restraint system 10 of the present invention may be applied to any other vehicle or other moving object. It is to be understood that the present invention is not limited to vehicle restraint systems, but also to other applications such as tape measures, dog leashes, and the like where it is desired to reduce the often rapid retraction of the inertia reel.

Figure 1C:
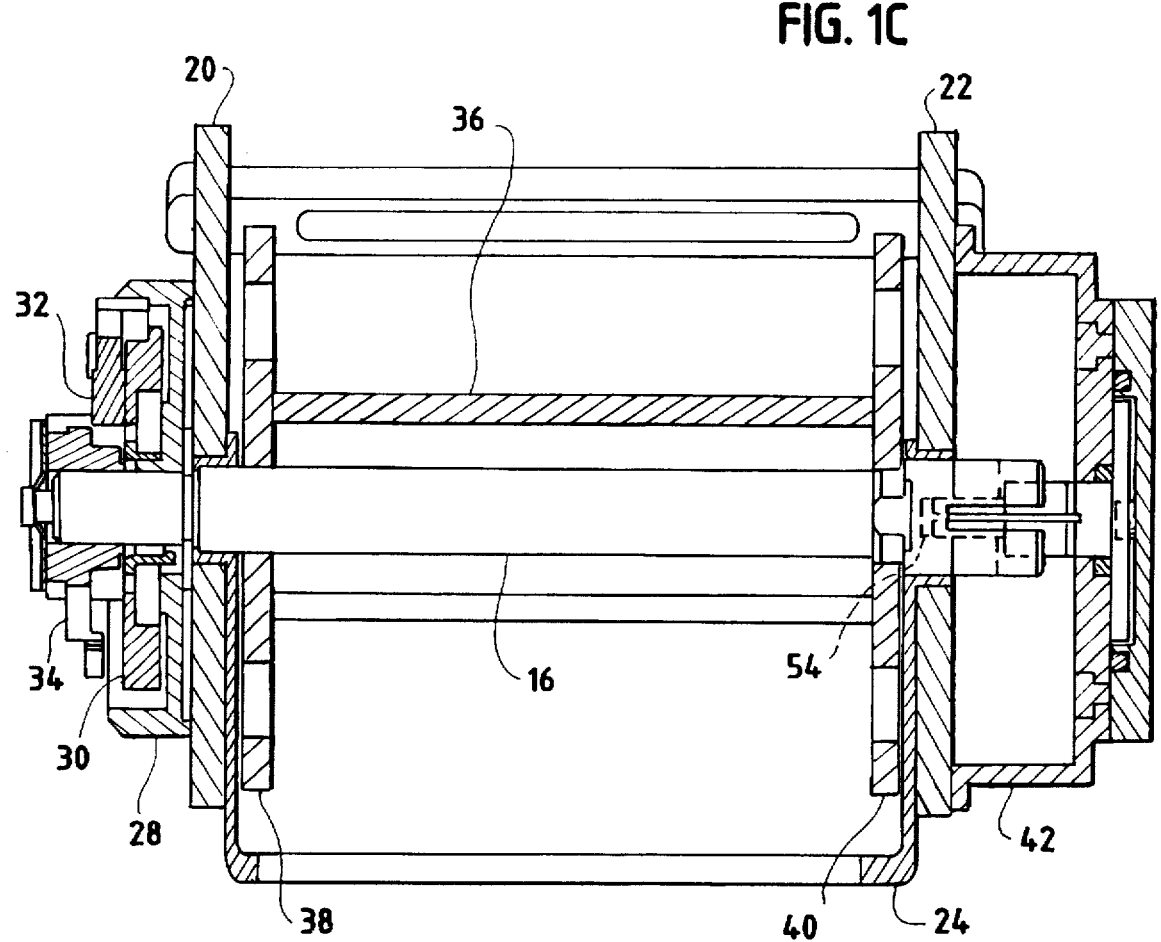
FIG. 1C is a cutaway view of an inertial reel according to the present invention, without the webbing attached, but showing a detailed view of the sensing mechanism according to one of the preferred embodiments.
Figure 2:
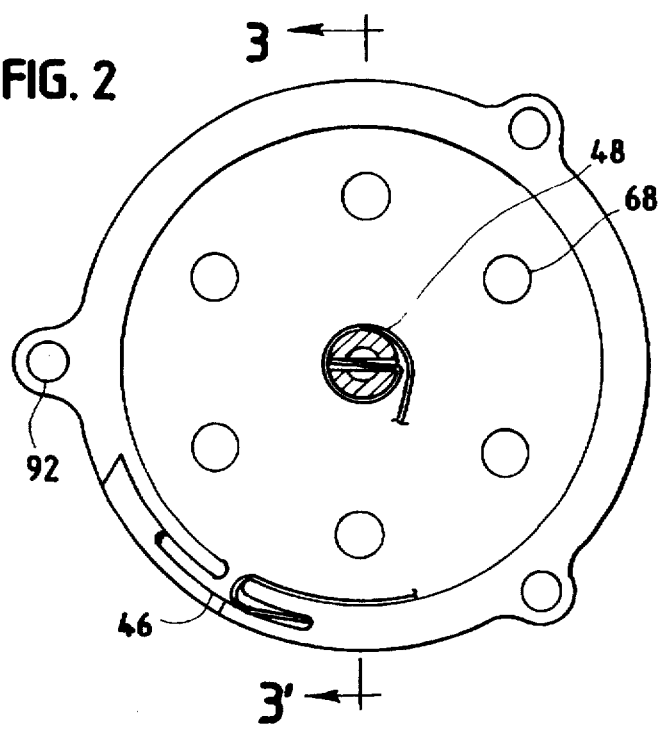
FIG. 2 is a front view of the spring cup according to the present invention.

A sensing mechanism 26 is mounted on the supporting frame 18. The purpose of the sensing mechanism 26 is to sense sudden rotations of the inertia reel 10 caused by a sudden unreeling of the webbing 12, and when such a rotation is detected, to lock the inertia reel 10 in place to prevent further unreeling of the webbing 12. FIG. 1C shows a more detailed view of the sensing mechanism 26, which is useful to explain its operation. Shaft 16 protrudes through a hole in frame wall 20 into the sensing mechanism 26. A mass 30 is mounted on the shaft 16. The mass 30 has the same axis of rotation as the shaft 16, but is allowed a certain amount of "play" with respect to the shaft 16; i.e., the mass is capable of a small angular rotation relative to the shaft 16.

A latch 32 is coupled to the mass 30 so as to move along with it. The latch 32 is attached to a flange 34 via a spring (not shown), and by a pivot with an axis of rotation offset from that of shaft 16. The flange 34 is fixed to the shaft 16. The mass 30 and latch 32 rotate inside of locking cup 28. The locking cup 28 has a toothed inner surface. During reeling and smooth unreeling of the webbing 12, the shaft 16, flange 34, mass 30, and latch 32, all rotate together. When the webbing 12 starts to suddenly unreel, the moment of inertia of the mass 30 causes a delay in its rotation relative to shaft 16. The angular displacement of the mass 30 relative to the shaft 16 causes the latch 32 to rotate about its pivot connection to flange 34, thereby driving latch 32 outward to engage the toothed surface of locking cup 28. This engagement moves the locking cup 28 through a small angular displacement, drawing with it the lock-bar 36 to which it is coupled. The lock-bar 36 thereby engages the toothed rims of ratchet wheels 38 and 40, preventing further rotation of the inertia reel 10 and further extension of the webbing 12. In the preferred embodiment, the webbing is a seat belt, so that this locking action restrains the motion of the wearer, preventing injury. Mechanisms capable of sensing sudden extensions of the webbing and stopping the sudden motion are well known in the art. Many other embodiments could be used without affecting the functionality of the present invention.

The spring cup 42 is affixed onto frame wall 22 on the opposite side of the sensing mechanism 26. The shaft 16 protrudes into the spring cup 42 through a hole in frame wall 22. A return spring 44 is coiled within the spring cup 42. One end of return spring 44 is attached to spring cup 42 by being fitted into a groove 46 in spring cup 42. The other end of spring 44, termed the bent end 48 engages shaft 16 by being fitted into slot 50 in damping disk 52, which is then inserted into the end of shaft 16. This end of shaft 16 features a hole 54, a long narrow slot 56, and a shorter wide slot 58. The damping disk 52 features a round small diameter prong portion 60 and a wider flattened spindle portion 62. When the damping disk 52 is coupled to shaft 16, the prong portion 60 fits into hole 54 and the spindle portion 62 fits into wide slot 58. The bent end 48 of return spring 44 fitted into slot 50 thereby protrudes from the long narrow slot 56 of shaft 16. In this way, the damping disk 52 and shaft 16 rotate together, moving return spring 44 as they rotate.

Figure 3:
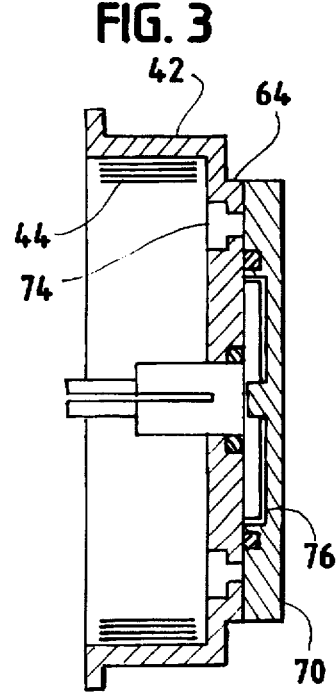
FIG. 3 is a cutaway view along line 3-3' of FIG. 2 of the spring cup assembly of the present invention.
Figure 4:
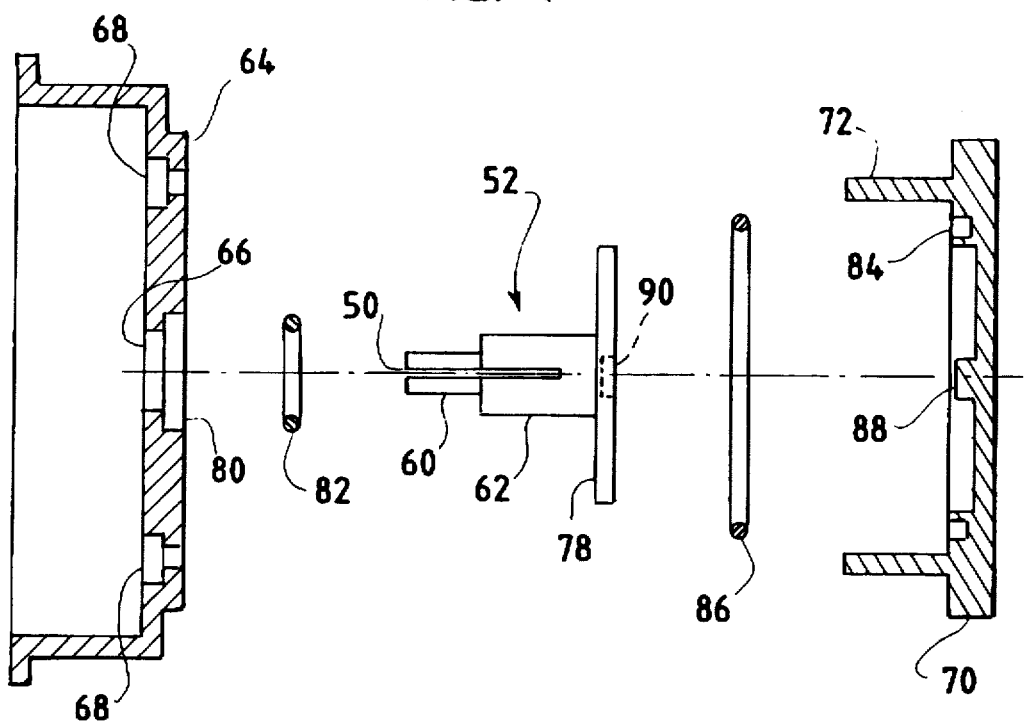
FIG. 4 is an exploded view of the spring cup assembly of the present invention, without the return spring installed.

The return spring 44 in the preferred embodiment is a long flat metal strip. When the webbing 12 is fully retracted, most of the length of return spring 44 is coiled up tightly against the inner surface of spring cup 42, as shown in FIG. 3. As the webbing 12 is pulled out from the inertia reel 10, the shaft 16 rotates counter-clockwise, which pulls return spring 44 away from the inner surface of spring cup 42 and toward the shaft 16. This pulling action causes a tension in return spring 44, which then exerts a torque on shaft 16. The torque is such as to tend to rotate the shaft 16 in the clockwise direction and hence to pull the webbing 12 back into inertia reel 10.

The spring cup 42 has a cup wall 64 which has a hole 66 in the center so the spindle 62 of the damping disk 52 may enter the spring cup 42 and mate with the end of the shaft 16. Mounted on the cup wall 64 is the damper housing 70. In the preferred embodiment, the mounting is accomplished in the following way. The cup wall 64 features six mounting holes 68 which are radially disposed about the center hole 66, and which accommodate six pins 72 on damper housing 70. In the preferred embodiment, the pins 72 are plastic. By heat staking, the pins 72 are shaped on the inside to completely fill mounting holes 68. Any excess pin material is removed so that the heat staked pins 74 are now flush with the inside of spring cup 42. This assures that the inside of the spring cup wall 64 continues to have a smooth finish that does not interfere with the operation of return spring 44. Many other means of attaching the damper housing 70 to the cup wall 64 will be apparent to those skilled in the art which will not affect the functionality of the present invention.

When damper housing 70 is mounted on cup wall 64, a space remains between the two pieces which forms the damping chamber 76. The flat portion 78 of damping disk 52 is seated in damping chamber 76, and the damping chamber 76 is filled with a damping fluid such as grease, paste, oil, or any other high viscosity material that does not significantly change its viscosity over the time and temperature ranges experienced by the device. In the preferred embodiment, the damping fluid used in the damping chamber 76 is a high-viscosity synthetic grease called NyoGel 774. Its viscosity at 25 degrees Centigrade is 13,200 centistokes, and it is useful to −30 degrees Centigrade. The grease is a grade of a new generation of relatively tacky, non-melting, shear-stable damping greases based on plastic-compatible synthetic hydrocarbon base oils that have a very high viscosity index and have a minimal change in damping characteristics with temperature changes. Other viscosity grades are available depending upon the application.

The damping chamber 76 is sealed against leakage in the following way. A circular groove 80 is made on the outside of cup wall 64, on the rim of the hole 66. A small O-ring 82 fits tightly around damping disk 52 and tightly within the groove 80 to prevent grease leaking from the damping chamber 76 into the spring cup 42. A larger circular groove 84 is located on the face of the damper housing 70. A large O-ring 86 fits in groove 84 and is pressed tightly against the cup wall 64 to prevent the leakage of damping fluid from the damping chamber 76. A small round lug 88 disposed on the center of the face of damping housing 76 fits into a round indentation 90 in the damping disk 42. The lug 88 together with the small O-ring 82 serves as a small axle on which the damping disk 52 rotates. The small O-ring 82 also keeps the surface of disk 52 a small distance away from the surface of the damping chamber 76.

When completely assembled the spring cup 42 is attached to the supporting frame 18 by means of three screws (not shown) inserted through three holes 92 in spring cup 42 into three corresponding holes (not shown) in the supporting frame 18.

Figure 5:
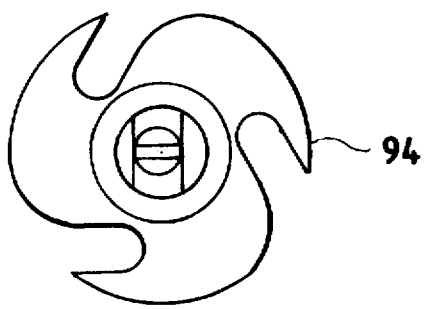
FIG. 5 is a front view of the damping disk of the present invention.
Figure 6:
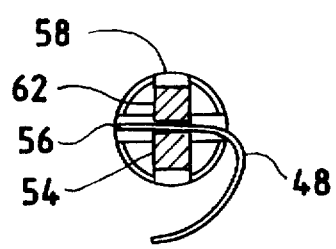
FIG. 6 is a cutaway view along line C—C of FIG. 1A.

FIG. 5 shows a front view of the damping disk 52. The disk portion 78 of damping disk 52 has three hook shaped vanes 94. The vanes 94 affect the amount of damping force generated when the disk 52 is rotated in the damping fluid. At a given rotation speed, the damping is greater when the damping disk 52 is rotated clockwise, corresponding to the webbing 12 being retracted, than when rotating counter-clockwise, corresponding to the webbing 12 being pulled out from the inertia reel 10. This is because as the damping disk 52 rotates clockwise, the vanes 94 dig into the damping fluid and move it toward the center of the damping chamber 76, thereby causing even greater damping force. The damping disk 52 and the damper housing 70 are made out of Delrin, an acetal resin homopolymer, in the preferred embodiment. However, any suitable material such as other plastics, or metals can be used.

When the shaft 16 turns counter-clockwise due to a forced unwinding of the webbing 12 from spool 14, the shaft 16 applies force that winds the return spring 44 about shaft 16. The damping disk 52 is also caused to rotate in the same direction. When the unwinding force on the webbing 12 is released, the rewinding force of the return spring 44 applies a torque simultaneously to shaft 16 and damping disk 52 turning them in a clockwise direction. The damping fluid in the damping chamber 76 resists the rotation of damping disk 52, exerting a drag force on it. This drag force is transmitted to the shaft 16 and tends to counteract the torque exerted by the return spring 44. In this way, the damping disk 52 in conjunction with the damping fluid in the damping chamber 76 causes the webbing 12 to rewind less rapidly on the spool 12 than it would normally on a conventional reel without the modifications of the present invention.

The webbing 12 is pulled out of the inertia reel 10 at a slow rate when the seat occupant is donning a safety belt and/or harness attached to the webbing 12. When the seat occupant removes the safety belt and/or harness, the rewinding force of the return spring 44 without the damping disk of the present invention causes very rapid rereeling of the webbing 12. This situation is when the damping effect of the invention is greatly needed. The present invention delivers the most damping force under the circumstances of a rapid retraction of the webbing 12. This is because the damping force is much greater in the rereeling direction and because the damping force increases with the speed of retraction. The damping also causes an increase in the force required to pull the webbing 12. This increase is small, however, because typically the webbing 12 moves slowly when pulled and because the damping disk 52 is designed to experience a much lower damping force when the webbing 12 is moving in that direction.

When the webbing 12 is pulled down out of a conventional inertia reel at arm's length and released, the webbing rewinds on the spool in less than a second. The webbing makes a sharp swishing sound as it rewinds, and the webbing stop hits the reel webbing guide with a hard bang, causing the approximately nine inches of webbing and metal lug beyond the webbing stop to fly around outside the inertia reel. When the same procedure is carried out with the present invention, it takes about two seconds for the webbing 12 to rewind and only a slight rewinding sound is heard. The webbing stop hits guide slot 24 with a light tap. The nine-inch length of webbing and metal lug beyond the webbing stop remains vertical with no tendency to fly around. The jerk on the webbing required to activate the webbing acceleration sensing mechanism 26 and lock the webbing 12 is not affected by the present invention.

While the principles of the invention have now been made clear in the illustrated embodiment, there will be immediately obvious to those skilled in the art modifications of structure, arrangements, proportions, the elements, materials, and components used in the practice of the invention without departing from those principles. The appended claims, therefore, are intended to cover and embrace any such modifications within the limits only of the true spirit and scope of the invention.

What is claimed is:

1. A seat restraint system used to protect a seat occupant from sudden decelerations, the seat restraint system comprising:

a supporting frame having two opposite walls;

an inertia reel mounted on said supporting frame, said inertia reel having
      a cylindrical spool,
      a shaft having a first and a second opposite ends, said shaft supporting said spool and said two opposite ends of said shaft being mounted on said two opposite walls of said supporting frame such that said spool and said shaft rotate on a perpendicular axis to said two opposite walls;

a webbing attached to said shaft, said webbing being reeled or unreeled around said spool depending on the direction of the rotation of said spool;

a damping disk attached to said first opposite end of said shaft;

a spring cup having at least one wall, said spring cup being attached to said supporting frame and having a spring having a first end attached to said spring cup and a second end attached to said first opposite end of said shaft proximate said damping disk such that said spring creates rotational force to cause said spool to rotate;

a damping housing having a wall attached to said at least one wall of said spring cup forming a damping chamber between said at least one wall of said spring cup and said wall of said damping housing encasing said damping disk; and wherein said damping chamber is filled with a high viscosity fluid which causes a fluid damping force against said damping disk when said damping disk is rotated.

2. The seat restraint system of claim 1 further comprising:

a sensing mechanism which prevents the sudden rotation of said spool in one rotation direction.

3. The seat restraint system of claim 1 wherein said damping disk is so shaped as to experience a greater fluid damping force when said damping disk is rotated in one direction than when said damping disk is rotated in the opposite direction.

4. The seat restrain system of claim 3, wherein said damping disk has three hook shaped vanes.

5. The seat restraint system of claim 1 wherein said high viscosity fluid is a synthetic damping grease.

6. The seat restraint system of claim 1 wherein said damper housing is attached to said spring cup by a plurality of integral plastic pins fit through a plurality of holes in said spring cup.

7. The seat restraint system of claim 6 wherein said pins are heat staked to be melted to fill to form a tight head for each of said pins.

8. The seat restraint system of claim 1 wherein said wall of said spring cup has a hole which receives a spindle which attaches said damping disk with said first opposite end of said shaft; and wherein said hole has a groove around its rim to accommodate an O-ring aligned in said groove around said hole of said wall of said spring cup to prevent leakage of said high viscosity fluid through said hole into said spring cup.

9. The seat restraint system of claim 1 further comprising an O-ring having a circumference greater than the circumference of said damping disk; and wherein said O-ring is placed in a circular groove located on said wall of said damping housing to prevent leakage of grease.

10. The seat restraint system of claim 1 wherein said damping disk and said damping housing are fabricated from an acetal resin homopolymer.

11. A rotationally-damped inertia reel mechanism designed to reduce slap-back action, the rotationally-damped inertia reel mechanism comprising;

a supporting frame having two opposite walls;

a spooling member having first and second opposite ends, said two opposite ends of said spooling member being mounted on said two opposite walls of said supporting frame such that said spooling member is capable of rotating on a perpendicular axis to said two opposite walls;

a flexible winding member attached to said shaft, said flexible winding member capable of being reeled or unreeled around said spooling member depending on the direction of the rotation of said spooling member;

a damping member attached to one of said opposite ends of said spooling member, said damping member being so shaped as to experience a greater fluid damping force when said damping member is rotated in one direction than when said damping member is rotated in the opposite direction;

a spring cup having at least one wall, said spring cup being attached to said supporting frame and having a spring having a first end attached to said spring cup and a second end attached to one of said opposite ends of said spooling member such that said spring creates rotational force to cause said spooling member to rotate; and a damping housing surrounding said damping member, forming a damping chamber therein;

wherein said damping chamber is filled with fluid causing a fluid damping force against said damping member when said damping member is rotated.

* * * * *

UNITED STATES PATENT AND TRADEMARK OFFICE
CERTIFICATE OF CORRECTION

PATENT NO. : 5,794,878 Page 1 of 1
APPLICATION NO. : 08/861882
DATED : August 18, 1998
INVENTOR(S) : Carpenter et al.

It is certified that error appears in the above-identified patent and that said Letters Patent is hereby corrected as shown below:

In column 8, line 24, in Claim 11, delete "shaft" and insert -- spooling member --

Signed and Sealed this

Twenty-second Day of July, 2008

JON W. DUDAS
*Director of the United States Patent and Trademark Office*